United States Patent
Reuland et al.

[15] 3,657,622
[45] Apr. 18, 1972

[54] CONTROL FOR ADJUSTING AND REGULATING THE SPEED OF AN ELECTRIC MOTOR

[72] Inventors: Frank E. Reuland, Newport Beach; Richard R. Palm, Brea, both of Calif.

[73] Assignee: Reuland Electric Company, Industry, Calif.

[22] Filed: Apr. 30, 1970

[21] Appl. No.: 33,184

[52] U.S. Cl. ............................................. 318/237, 318/240
[51] Int. Cl. ........................................................ H02p 7/62
[58] Field of Search ................................. 318/237–241, 197

[56] References Cited

UNITED STATES PATENTS

| | | | |
|---|---|---|---|
| 2,501,361 | 3/1950 | Taylor | 318/237 |
| 3,529,224 | 9/1970 | Bedford | 318/237 |
| 3,227,937 | 1/1966 | Koppelmann et al. | 318/237 |
| 3,439,245 | 4/1969 | Perdue | 318/237 |
| 2,947,930 | 8/1960 | Feldhausen | 318/240 X |
| 3,327,189 | 6/1967 | Hedstrom | 318/237 X |

*Primary Examiner*—Gene Z. Rubinson
*Attorney*—Paul A. Weilein

[57] ABSTRACT

Control means for adjusting and regulating the speed of an alternating current electric motor of the wound rotor type, wherein the motor stator is connected to an alternating current power line, and the circuit leads of the rotor winding are connected through gate controlled solid-state switching elements which are operable to rapidly close and open the rotor winding circuit so as to produce pulsed power, and by varying the duration of the produced pulses the average torque will be varied and the motor speed regulated. The gate controlled switching elements are automatically controlled in response to changes in a sensed signal resulting from a comparison of a speed sensitive transducer output voltage with a reference voltage which can be adjustably set according to the desired motor speed. Changes in the reference voltage thus provide for adjustment of the motor speed, while the variations of the transducer voltage in relation to the adjusted reference voltage provide for speed regulation at the selected motor speed.

5 Claims, 4 Drawing Figures

INVENTORS.
FRANK E. REULAND
RICHARD R. PALM
BY
Paul A. Weilein
ATTORNEY

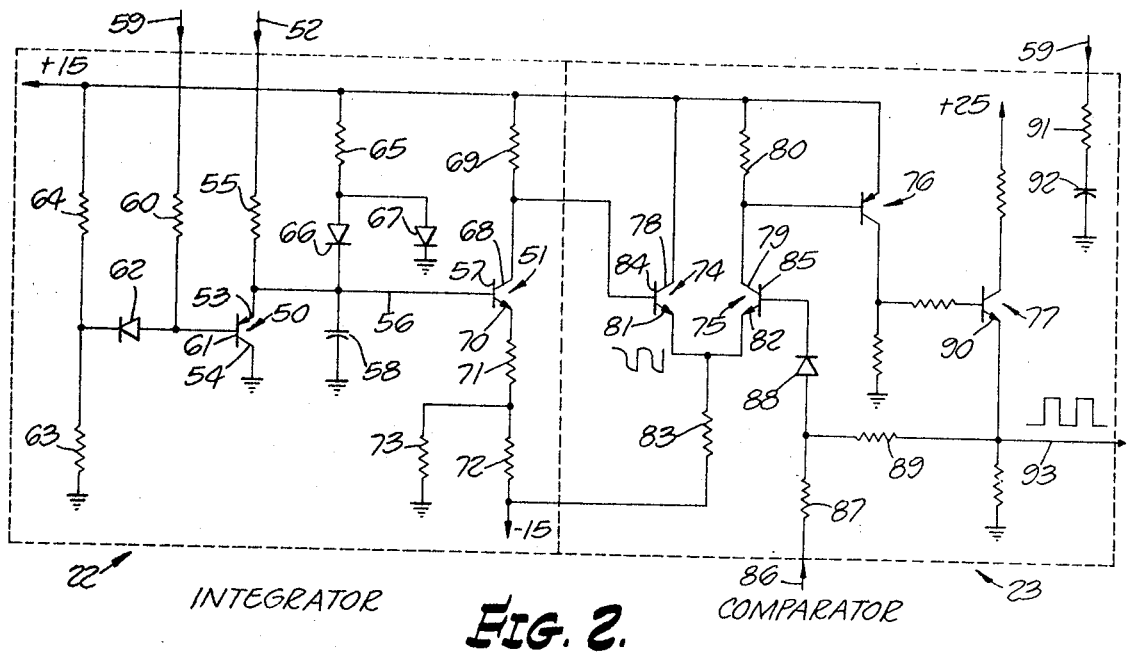
FIG. 2.
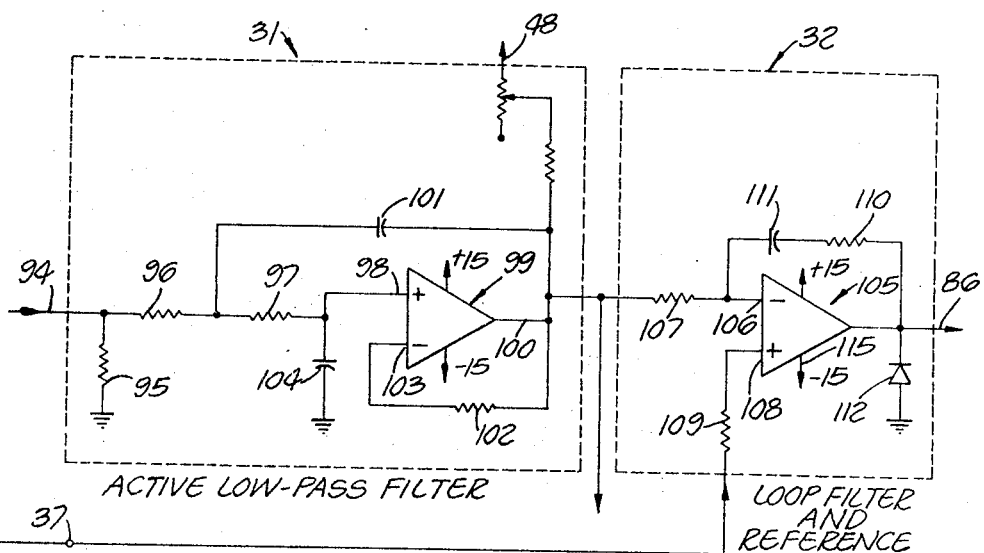
FIG. 3.
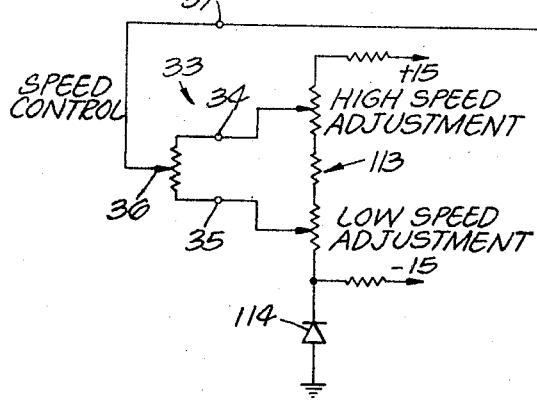
INVENTORS.
FRANK E. REULAND
RICHARD R. PALM
BY
Paul A. Weilein
ATTORNEY

CONTROL FOR ADJUSTING AND REGULATING THE SPEED OF AN ELECTRIC MOTOR

BACKGROUND OF THE INVENTION

The present invention relates to electric motors and their speed adjustment and regulation.

Heretofore, adjustable speed alternating current electric motors have in general been classifiable into three basic categories:

a. Where the alternating current line power is converted to adjustable direct current power for the operation of a direct current motor.

b. Wherein the alternating current line power is converted into adjustable frequency-voltage alternating current power for use with an alternating current motor.

c. That in which the alternating current line power is converted to adjustable voltage alternating current power for use with a special high slip alternating current motor, this system depending on the load to reduce the speed to the required rpm.

All of the above arrangements require that the conversion unit be sufficiently large to permit handling of the full power required for the adjustable speed motor.

In the present invention, the adjustment and regulation of the speed of an alternating current motor is obtained according to a new concept which permits a conventional alternating current motor of the wound rotor type with its primary winding, normally the stator, to be connected to the alternating current line power; and, through the use of novel control means connected with the rotor secondary winding, any preset speed and with any torque output from 0 percent through 100 percent of torque rating can be maintained within the speed range of opening and closing the secondary winding circuit in a controlled manner. The speed control acts as a simple on-off control and does not have to have the ability to handle the full electrical power required by the motor, thus permitting the motor to operate more efficiently, economically, and maintenance-free with greater reliability than the motor arrangements in the basic categories described above.

For example, in the case of a three-phase, slip ring or wound rotor motor, if the leads from the slip rings are shorted, closing the secondary winding circuit, the motor will run as a squirrel cage motor; but, if the leads are open circuited no current will flow in the rotor and no torque will be developed, and the motor will not run. Under such condition, the only current flow in the stator will be the magnetizing current.

In the present invention, it is proposed to utilize the changes in rotor power during conditions of operation as a control function and provide a novel control arrangement whereby the secondary circuit of the rotor will be opened and closed rapidly in order to develop pulsed power. By varying the duration of the power pulses, the average torque can be varied and therefore the speed regulated in response to a sensed signal. According to the present invention, the signal voltage comprises a composite of this control function with a speed sensitive transducer output voltage and a reference voltage which can be set according to the desired speed, the resulting signal voltage being utilized to control the operation of solid-state switching components such as SCR's or TRIACS for opening and closing the secondary circuit of the motor.

Utilization of the aforementioned new concept indicates that extremely good speed regulation is an inherent characteristic of the motor and associated control, even under high overloads, and that breakdown and stalled torques are high even at very low speeds. Due to extremely low inrush and stalled rotor current, momentary stalled conditions, frequent starting, plugging and plug reversing have been found to be well within the capabilities of the arrangement without modification to either the motor or control as disclosed for the present invention.

SUMMARY OF THE INVENTION

The present invention relates generally to electric motors, and is more particularly concerned with improved control means for adjusting and regulating the speed of motors of the alternating current type.

It is one object of the herein disclosed invention to provide reliable control of small size which can be mounted in a small space adjacent the motor or remotely from the motor with which it is utilized, and which in combination with the motor permits the utilization of a standard alternating current wound rotor motor in a manner which permits adjustment and regulation of its speed.

It is a further object to provide speed adjusting and regulating control for an alternating current motor, wherein the rotor winding circuit will be open circuited and short circuited and produce power pulses, and wherein the duration of the power pulses can be varied in order to vary the average torque and the regulated speed of the motor.

A still further object is to provide a speed adjusting and regulating control for alternating current motors that utilizes solid state components which are controlled in response to variations in a sensed signal, and wherein the characteristics of the sensed signal are varied by comparing a speed sensitive transducer output voltage with a reference voltage which can be adjustably set according to a desired motor speed, the variations in the sensed signal being utilized to actuate the switching components to either open or close the circuit of the rotor winding.

Another object is to provide a speed adjusting and regulating control for alternating current motor of the wound rotor type which will automatically adjust the rotor power in a manner to maintain a preset speed under varying shaft load conditions by controlling the firing point of an electronic switching component twice each cycle in each phase of the rotor winding.

Still another object is to provide a control such as the foregoing in which an integrator circuit is utilized to provide a control function proportional to the rotor power for determining the firing points of the electronic switching components, and wherein the integrator resets at the end of each alternating power cycle to provide a constant firing value rather than a ramp function.

Yet another object is to provide a unique relay control, which is responsive to a speed characteristic of the motor, for automatically varying resistor components in the rotor winding circuits at selected speed values for increasing the rotor torque, particularly at the lower speeds depending upon the installation requirements, and for reducing heat dissipation in the rotor.

Further objects and advantages of the invention will be brought out in the following part of the specification wherein detailed description is for the purposefully disclosing one embodiment of the invention without placing limitations thereon.

BRIEF DESCRIPTION OF THE DRAWINGS

Referring to the accompanying drawings, which are for illustrative purposes only:

FIG. 2 is a circuit diagram schematically disclosing the circuitry details of the integrator-comparator portion of the control for generating the signal output for triggering the electronic switching means associated with the motor rotor windings;

FIG. 3 is a circuit diagram schematically disclosing the circuitry details of the speed pick-up and interconnected speed control portions of the control of the present invention.

DESCRIPTION OF THE PREFERRED EMBODIMENT

Figure 1:
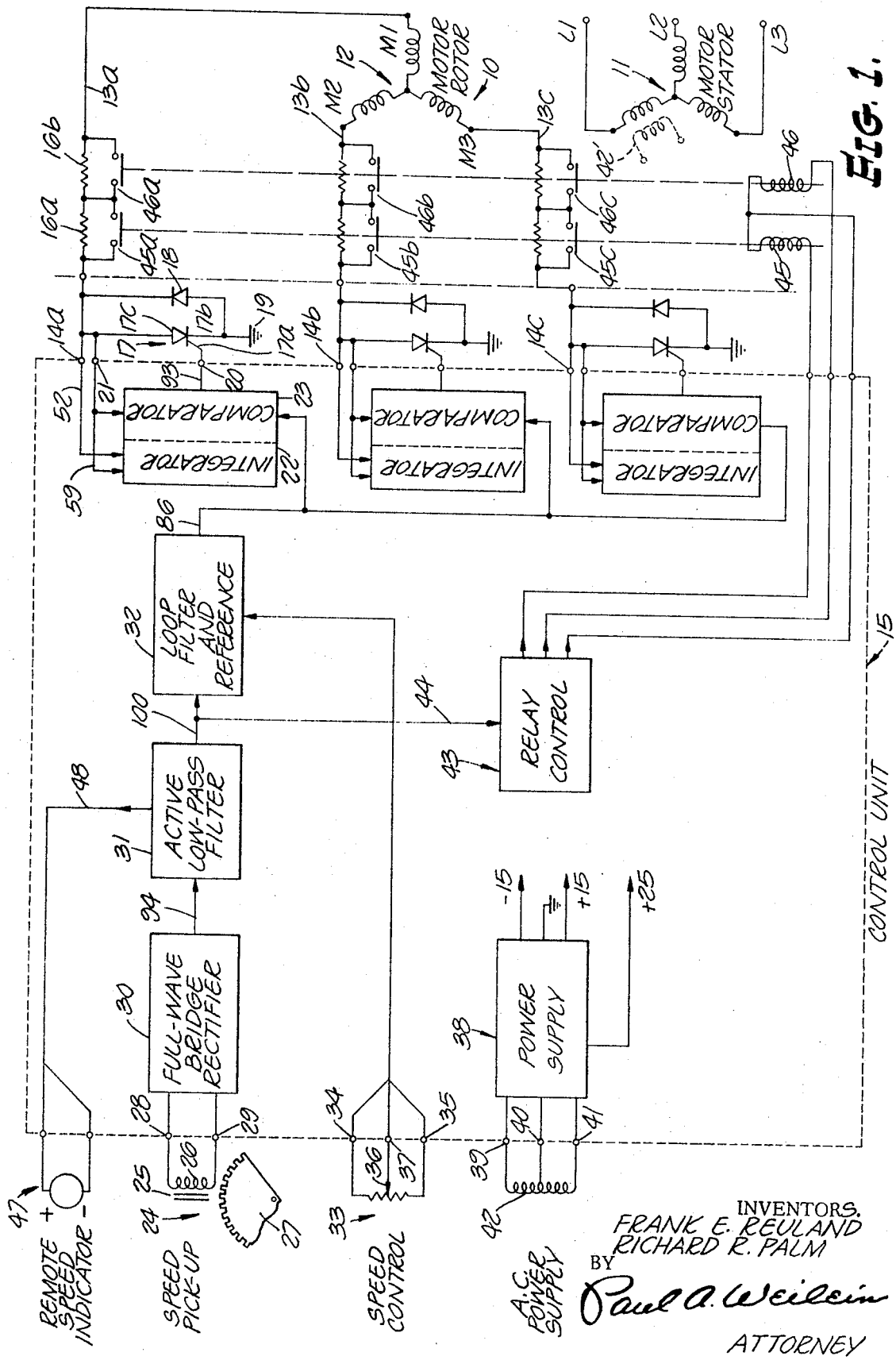
FIG. 1 is a block diagram disclosing control means according to the present invention, together with an alternating current motor with which it is associated.

Referring more specifically to the drawings, for illustrative purposes, the control of the present invention is shown in the block diagram, FIG. 1, as being utilized with a three-phase alternating current motor of conventional construction, as indicated generally by the numeral 10, and comprising the usual stator winding 11 and rotor winding 12. The stator winding is shown as being Y-connected with line terminals L1, L2, and L3 which are connectable with a suitable alternating 3-phase line power source in conventional manner. The rotor winding is also shown as being Y-connected and having terminals M1, M2, and M3, which are in conventional practice connected to slip rings (not shown), and in this case connected with external connection leads 13a, 13b, and 13c. These leads are connected respectively with terminals 14a, 14b, and 14c of a control unit as generally indicated at 15, and which may be mounted adjacent to or remotely from the motor to be controlled. Each of the connection leads 13a, 13b, and 13c is provided with one or more current limiting resistors such as 16 a and 16b which are utilized to increase torque at lower speed and can be varied depending upon the particular application and size of motor. These resistors also reduce some of the heat dissipated by the rotor.

Conventionally, motors of the wound-rotor type are controlled by shorting out series resistors in each phase winding in order to change the speed from a low speed to a maximum speed in which all the resistors are shorted out. This type of control requires the use of a greater number of contactors and associated switching equipment necessitating undesirable additional space, which is not always available, and makes the installation indeed very complicated. In the present invention, speed control is obtained by opening and shorting the rotor windings at a fixed on-to-off ratio to obtain the required amount of power for a particular speed setting in the rotor. The longer the rotor windings are maintained shorted, the greater will be the power generated and therefore the higher will be the speed of the rotor. Switching is obtained in each phase of the motor rotor leads by means of an electronic switching device 17 and associated diode 18 connected in parallel, the switching device and diode being connected as a unit between the connection lead and ground 19. The switching device is shown as comprising a silicon controlled rectifier commercially known as SCR. The switching device is provided with a gate control electrode 17a which connects with a terminal 20 of the control unit 15. A cathode electrode 17b connects with the ground 19, while the anode 17c connects with the connection lead, in this case connection lead 13a, and a terminal 21 of the control unit.

With the switching device 17 and diode 18 as thus connected, it will be evident that the signal which appears across the switching device, when it is not conducting, will be a rectified half-wave. Also, since the outputs of the three rotor windings are in 120° phase relation, the control of each winding circuit is accomplished independently with respect to the determination of the firing time of the switching device associated therewith. The control circuitry in each case is identical, but dependent upon the particular phase relationship of the incoming rotor signal. In order to control the power in the rotor winding, which in turn controls the motor speed, the switching devices must fire at a particular conduction angle in each cycle and must also fire in successively delayed 120° phase relation with respect to each other.

It will be appreciated that the conduction angle cannot be determined as a function of the rotor frequency or voltage independently for the reason that at zero speed the AC rotor signal frequency is 60 cycles and the voltage is maximum, and at synchronous speed the output frequency and voltage are zero. As an important feature of the present invention, utilization of these rotor characteristics is made possible by providing an electronic integrator 22 by means of which the conduction angle can be determined for each rotor winding. The output voltage of the integrator is in each case proportional to the power in the rotor winding with which it is associated, and by utilizing a comparator 23 for comparing the output of the integrator with a known reference voltage, the conduction angle can be definitely determined. The integrator and comparator are so connected that when the integrator voltage becomes equal to the reference voltage, the comparator will switch to control a triggering or gating circuit of the associated switching device 17. This provides a control which enables variation of the conduction angle simply by varying the reference voltage, and by varying the conduction angle it will change the amount of power in the rotor and its consequent speed.

In order to obtain a constant speed during variations in the motor load and its input voltage, there is provided a speed pick-up device which senses speed changes of the motor rotor and produces a voltage output which is variable as a function of the speed of the motor. The pick-up device may vary as to its construction and operation, but in one form, as illustrated, may comprise an induction generator which will produce an AC signal proportional to the motor speed. As diagrammatically shown, the speed pick-up device comprises a magnetic core 25 having magnetically coupled relation with a coil 26. The magnetic path in the core is arranged to be modulated by an associated toothed rotor 27 driven from the motor rotor. The output of the coil 26 is connected to terminals 28 and 29 of the control unit 15.

The output of the pick-up device 24 is fed to a full-wave bridge rectifier 30, the output of which is connected with an active low-pass filter 31 for the purpose of removing the alternating current frequency component from the rectified signal in order that the output will be as pure as possible and provide a true analog of the speed. This output from the active low-pass filter 31 thus represents a particular speed that can be compared with a known reference voltage by means of a loop filter and reference 32, the known reference voltage in this case comprising a voltage derived from a power source within the control unit 15, and which may be adjustably set by means of a speed control potentiometer 33 connected to terminals 34 and 35 of the control unit, and with a movable contact 36 connected to a terminal 37 of the control unit.

The loop filter is so arranged that its output voltage increases or decreases at a rate proportional to the difference between the reference voltage supplied from the speed control 33 and the DC voltage analog of speed emanating from the speed pick-up 24. If the speed control voltage is larger than the speed pick-up voltage, the output of the loop filter 32 increases until the speed pick-up voltage equals the speed control voltage, and then holds that output voltage which becomes the reference voltage of the comparator. This action takes place because the increase in the loop filter output voltage operates through the comparator to cause the conduction angle of the rotor to increase, whereupon the rotor speed increases and in turn causes the speed pick-up voltage to increase. Therefore, it will be seen that the loop filter will control the conduction angle such that under variations in load, the speed pick-up voltage will equal the speed control voltage, thereby holding the speed constant. The converse of the above is also true in that by varying the speed control voltage the motor speed can be made to vary. There is also included in the control unit 15, a power supply, as generally indicated at 38, this power supply having its input connected with terminals 39, 40 and 41 of the control unit, to receive an AC supply voltage from a suitable source of low voltage, such as indicated by the connected coil 42. This voltage may be derived from any source, and if desired may emanate from a coil 42' which is inductively coupled with one of the phase displaced windings of the motor stator. The power supply circuitry is conventional and is capable of providing output voltages of +15, −15 and +25. The 25 volt output is unregulated, since it is only required to fire the switching devices 17. The plus and minus 15 volt outputs are well regulated, since these voltages are used to determine the reference voltages utilized in the speed control circuitry.

There is also provided in the control unit 15 a relay control as generally indicated at 43. An input connection 44 supplies the DC voltage speed analog output of the active low-pass filter 31 to the relay control wherein the speed analog voltage is compared in several comparators with adjustable preset reference voltages to provide switching means for selectively energizing control relays at different speed levels so as to control short circuiting of resistors in the lead connections of the motor rotor in the desired manner. For illustration, two relays are shown having operating coils 45 and 46. Each relay has contacts in each of the outlet leads 13a, 13b and 13c from the motor rotor. For example, relay coil 45 is arranged to close, upon energization, contacts 45a, 45b, and 45c which will short out the resistor 16a in each lead. The relay coil 46 is arranged to actuate contacts 46a, 46b, and 46c. As exemplary of the use of these relays, both relays would have their contacts in open position in a low speed range, e.g., 0–900 rpm. As the speed is increased to a range, e.g., 900–1200 rpm, one of these relays would operate to short a resistor in each of the rotor connection leads. In a high speed range, e.g., 1,200–1,800 rpm the other relay would operate to short out the remaining resistor in each lead. Torque control is thus provided in different speed ranges of the motor operation, depending upon installation requirements.

For convenience in providing a visual indication of the motor speed, there is provided a speed indicator 47 connected by circuitry 48 with the DC voltage analog of speed output of the active low-pass filter 31.

Figure 4:
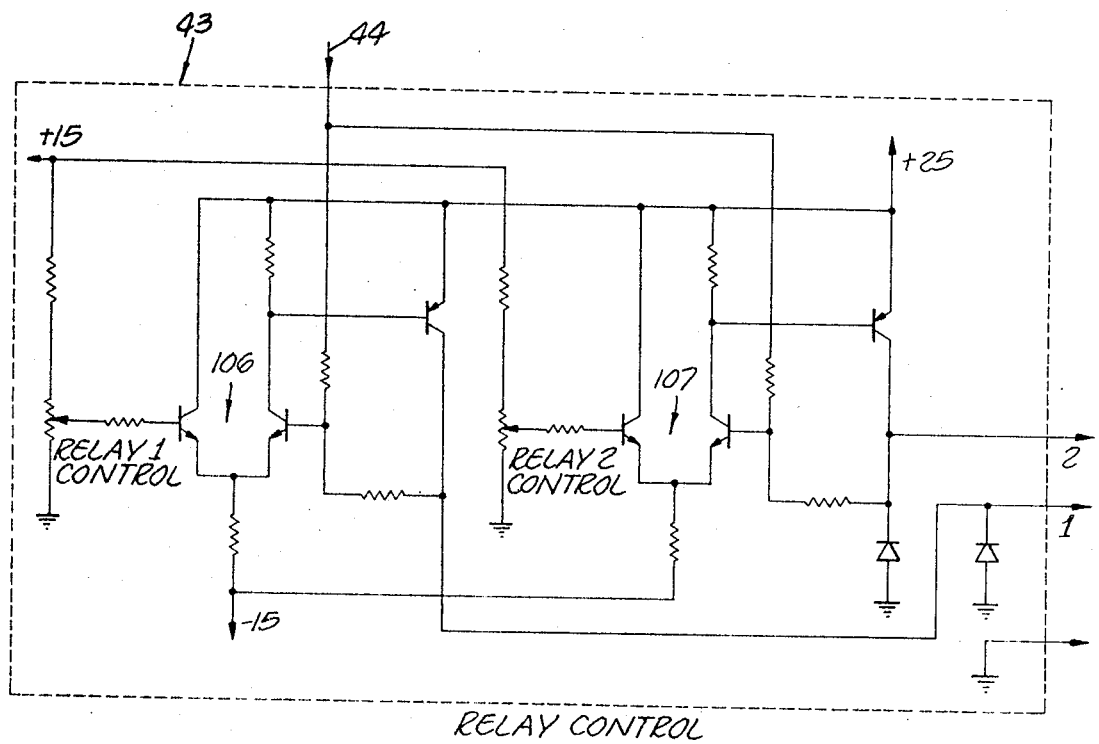
FIG. 4 is a circuit diagram schematically disclosing the circuitry details of the automatic relay control as embodied in the invention.

For a more detailed description of the circuitry, reference is now made to FIGS. 2, 3, and 4. Since each phase of the rotor output contains an integrator-comparator combination having similar circuitry, the circuitry of only one of the integrator-comparator combinations will be described. As shown primarily in FIG. 2, integrator 22 utilizes a transistor 50 and a transistor 51, an input signal being fed directly from the rotor connection lead connected to terminal 14a through a conductor 52 to the emitter 53 of the transistor 50, its collector 54 being connected to ground. The input to transistor 50 contains a resistor 55 which is connected, at its juncture with the emitter 53, through a connection 56 to the base 57 of the transistor 51. The connection 56 also connects to one side of a capacitor 58, the other side of this capacitor being grounded. The resistor 55 and capacitor 58 as thus connected comprise an RC integrator network, the output of which is proportional to the power in the connected phase winding of the rotor. The output of this network feeds into the transistor 51 which serves as an amplifier buffer stage. A conductor 59 connects terminal 21 of the control unit through a resistor 60 with the base 61 of transistor 50, the base also being connected through a diode 62 to the juncture of resistors 63 and 64. Resistor 63 is connected with ground, while the resistor 64 connects with the positive side of the established supply voltage. The resistors 60, 63, and 64 together with diode 62 are utilized to provide a resistor and equivalent zener diode combination for protecting the base of transistor 50 from the high voltages obtained on the rotor. A resistor 65 is connected on one side to the positive supply voltage and on its other connects through a diode 66 to connection 56, and by a branch circuit through another diode 67 to ground. This resistor and the two diodes are utilized to generate a bias current to compensate for the base leakage current of transistor 51 which is driven by the integrator circuit. With the transistor 50 connected as heretofore described, this transistor will operate to reset the integrator to zero on each half-cycle. This is necessary for the reason that the rotor voltage comprises a half-wave rectified voltage with a DC component which, if not reset, would cause the integrator output to keep increasing with every cycle. In this manner, a constant firing value is obtained rather than a ramp function.

The transistor 51 has a collector 68 connected through a resistor 69 with the positive side of the supply voltage, while its emitter 70 is connected through series resistors 71 and 72 to the negative side of the supply voltage. At the junction of resistors 71 and 72, a branch connection leads to ground through a resistor 73. These resistors are of a value to set the gain of transistor 51 to 2 and buffer the integrator from the comparator circuit.

The comparator 23 embodies a circuit in which transistors 74 and 75 are interconnected to provide a differential amplifier which drives a transistor 76 as an additional amplifier stage, the output of this stage being utilized to drive a transistor 77 and emitter follower for controlling the gate control circuit of the switching device 17 of the connected phase winding of the motor rotor.

The transistor 74 has a collector 78 connected directly with the positive supply voltage side of the circuit while transistor 75 has a collector 79 connected to the positive supply voltage side through a resistor 80. The respective emitters 81 and 82 of these two transistors are connected through a common resistor 83 with the negative side of the supply voltage. Transistor 74 has its base 84 connected to one input of the comparator, which in this case comprises the output from transistor 51. Transistor 75 has its base 85 connected with another input to the comparator which in this case comes from a reference voltage output connection 86 of the loop filter 32, this connection being made with the base 85 through a resistor 87 and diode 88. A resistor 89 connected between the emitter 90 of transistor 77 and the junction between resistor 87 and the diode 88 provides a positive feed-back input which functions to obtain hysteresis and fast switching time as a result of sharper pulses in the comparator. A resistor 91 and capacitor 92 connected between conductor 59 and ground produces a parallel circuit with the associated switching device 17 and assures proper phase relationships across the rotor so that the switching device will not fire prematurely. The pulse tripping output from the transistor 77 is by conductor 93 leading to terminal 20 of the control unit 15.

Referring now to FIG. 3, the active low-pass filter receives the rectified speed pick-up signal through an output conductor 94, the output of the rectifier being loaded by a resistor 95. The low-pass filter is comprised of series connected resistors 96 and 97 leading to a positive terminal 98 of an operational amplifier as generally indicated at 99 and which is utilized for reducing the ripple from the rectifier output and to provide at output connection 100 a purer DC for the input to the loop filter 32. The output of the amplifier has one connection leading through a capacitor 101 to the juncture between the resistors 96 and 97. Another connection leads from the output through a resistor 102 to a negative terminal 103 at the amplifier input. The positive terminal 98 connects through another capacitor 104 with ground. Thus, at the output connection 100 there is produced a DC output analog of the motor speed.

The loop filter and reference 32 comprises an operational lead-lag network using an operational amplifier as generally indicated at 105. The negative terminal 106 receives the output from the low-pass filter through a resistor 107. The positive terminal 108 receives a reference voltage as established by the speed control 33 through a resistor 109. This amplifier has a high gain so that with very small differences between the two inputs to the amplifier, a large output will be obtained and fed to the output connection 86. A circuit connection from the amplifier output to the input terminal 106, that contains a resistor 110 and capacitor 111, provides a feed-back network which in conjunction with resistor 107 determines the operational integrator time constant. A diode 112 connected to the amplifier output serves to clamp the output so that it does not swing negative.

The voltage reference for the speed control adjustment includes an adjust potentiometer 113 which connects across the +15 and −15 volt supply voltage circuit shunted by a diode 114. This is used to obtain a slightly negative voltage of approximately 0.5 volts at the terminal 35 of the control unit. The reference potentiometer 113 is used to adjust the voltage at connection 115 of the amplifier 105 to coincide with the output voltage of the low-pass filter at maximum speed, so that the full dynamic range of the speed control potentiometer 33 can be utilized for speed control.

Referring to the relay control circuitry as shown in FIG. 4, two comparator differential amplifier circuits, as generally indicated at 106 and 107, are basically operative in the same manner as the comparator previously described and as illustrated in FIG. 2. Each of the differential amplifiers 106 and 107 is arranged to compare the DC voltage speed analog with a preset reference voltage which determines the speed levels at which it is desired to have relays 1 and 2 respectively operate. The comparator 106 is utilized to control the operation of relay coil 46, while the comparator 107 controls the operation of relay coil 45. In view of the detailed description of the comparator in connection with FIG. 2, it is believed that it will be unnecessary to describe in further detail the circuitry and operation of the comparators as utilized in the relay control.

It is to be understood that the circuitry as herein described may vary in respect to the values of those particular components which have been specifically mentioned; and by way of illustration the following noted values have been used in a successfully operable arrangement as disclosed.

Resistors:

| | |
|---|---|
| 55 | 820 K ohms |
| 60 | 100 K ohms |
| 63 | 1 K ohms |
| 64 | 2.2 K ohms |
| 65 | 51 K ohms |
| 69 | 20 K ohms |
| 71 | 10 K ohms |
| 72 | 8.2 K ohms |
| 73 | 1 K ohms |
| 80 | 10 K ohms |
| 83 | 10 K ohms |
| 87 | 5.1 K ohms |
| 89 | 51 K ohms |
| 91 | 10 K ohms |
| 95 | 2.2 K ohms |
| 96 | 100 K ohms |
| 97 | 100 K ohms |
| 102 | 220 K ohms |
| 107 | 62 K ohms |
| 109 | 22 K ohms |
| 110 | 330 K ohms |

Capacitors:

| | |
|---|---|
| 58 | 0.47 microfarad |
| 92 | 0.1 microfarad |
| 101 | 0.47 microfarad |
| 104 | 0.02 microfarad |
| 111 | 0.22 microfarad |

Diodes:

| | |
|---|---|
| 18 | IN 1187 R |
| 62 | IN 4154 |
| 66 | IN 4154 |
| 67 | IN 4154 |
| 88 | IN 4154 |
| 112 | IN 4154 |
| 114 | IN 4154 |

Transistors:

| | |
|---|---|
| 50 | TQ 59 |
| 51 | TN 59 |
| 74 | TN 59 |
| 75 | TN 59 |
| 76 | TQ 59 |
| 77 | TN 59 |

Silicon Controlled Rectifier:

| | |
|---|---|
| 17 | 2N5170R |

From the foregoing description and drawings, it will be clearly evident that the delineated objects and features of the herein described invention will be accomplished.

Various modifications may suggest themselves to those skilled in the art without departing from the spirit of our invention and, hence, we do not wish to be restricted to the specific form shown or uses mentioned, except to the extent indicated in the appended claims.

We claim:

1. Speed control means for an electric motor having a stator field winding and a power delivery rotor with a winding in magnetically coupled relation with the stator field winding, comprising:
   a. gating means connected in circuit with said rotor winding, and being selectively operable to connect said rotor winding so as to be short-circuited and open-circuited, said gating means including a gate control triggering circuit;
   b. means for controlling said triggering circuit in response to a sensed signal which varies as a function of rotor speed changes, said means comprising integrator means connected with the motor rotor circuit for providing output pulses proportional to rotor power and which are determinative of the conduction angle of the rotor winding during half-cycle periods; and electronic comparator means having an output controllably connected with said triggering circuit, said comparator having one input connected to receive the output of said integrator, and another input connected to a DC reference voltage adjustable according to the desired motor speed; and
   c. means for resetting the integrator means to zero on each half-cycle of the sensed rotor signal.

2. Speed control means for an electric motor having a stator field winding and a power delivery rotor with a winding in magnetically coupled relation with the stator field winding, comprising:
   a. gating means connected in circuit with said rotor winding, and being selectively operable to connect said rotor winding so as to be short-circuited and open-circuited, said gating means including a gate control triggering circuit; and
   b. means for controlling said triggering circuit comprising a DC reference voltage adjustable to preset the motor speed to a desired value, a DC voltage analog of the motor speed, and a differential lead-lag network having inputs connected to said reference voltage and said analog voltage and being operative to provide an output DC voltage control signal in said triggering circuit proportional to the power required to maintain the preset speed under variable load conditions.

3. Control means according to claim 5 including comparator circuits each having one input connected to receive the output of one of the integrator circuits, and another input connected with the output of the differential lead-lag network whereby, when the input from the differential lead-lag circuit for the power required to maintain the preset speed during each cycle and the input from the associated integrator for the remaining power available in the same cycle are equal, the comparator output will actuate the connected triggering circuit to deliver the power required.

4. Control means according to claim 3, including reset circuit means for controlling the operation of the integrator circuits and the comparator circuits during each cycle in each of the three phases so as to maintain a constant preset speed irrespective of fluctuations of load, voltage, temperature or power factor.

5. Speed control means for an electric motor having a stator field winding and a power delivery rotor with a winding in magnetically coupled relation with the stator field winding, comprising:
   a. gating means connected in circuit with said rotor winding, and being selectively operable to connect said rotor winding so as to be short-circuited and open-circuited, said gating means including a gate control triggering circuit;
   b. means for controlling said triggering circuit comprising a DC reference voltage adjustable to preset the motor speed to a desired value and a DC voltage analog of the motor speed, and which are connected as inputs to a differential lead-lag network to provide an output DC voltage control signal proportional to the power required to maintain the preset speed under variable load conditions; and c. integrator circuits respectively having an input connected with one phase of the rotor circuit and an output signal that is proportional to the remaining power available in each cycle of the connected phase, regardless of the voltage or frequency.

* * * * *